United States Patent [19]

Hasegawa et al.

[11] Patent Number: 5,494,167
[45] Date of Patent: Feb. 27, 1996

[54] RETURNABLE CASE

[75] Inventors: Nobutoshi Hasegawa, Suzuka; Hisato Fukuda, Yokkaichi; Makoto Tani, Mie, all of Japan

[73] Assignees: Honda Giken Kogyo Kabushiki Kaisha; Kabushiki Kaisha Honda Express, both of Japan

[21] Appl. No.: 231,716

[22] Filed: Apr. 22, 1994

[30] Foreign Application Priority Data

Apr. 23, 1993 [JP] Japan .................................... 5-098164
Apr. 23, 1993 [JP] Japan .................................... 5-098165

[51] Int. Cl.⁶ .................................................. B65D 19/44
[52] U.S. Cl. .......................... 206/600; 108/56.1; 270/1.5; 270/7
[58] Field of Search ................................ 108/56.1, 55.1; 206/386, 600; 200/6, 7, 1.5, 401

[56] References Cited

U.S. PATENT DOCUMENTS

| | | | |
|---|---|---|---|
| 2,420,640 | 5/1947 | Acteson | 128/56.1 X |
| 3,565,018 | 2/1971 | Jay | 108/56.1 X |
| 4,099,640 | 7/1978 | Nessfield | 220/6 |
| 4,171,059 | 10/1979 | Heller et al. | 220/1.5 X |
| 4,177,907 | 12/1979 | Funaioli et al. | 220/1.5 |
| 4,662,532 | 5/1987 | Anderson et al. | 220/7 |
| 4,735,331 | 4/1988 | Keenan et al. | 220/6 |
| 5,056,667 | 10/1991 | Coogan | 206/600 |

*Primary Examiner*—Bryon P. Gehman
*Attorney, Agent, or Firm*—Dickstein, Shapiro & Morin

[57] ABSTRACT

A returnable case which is assembled or disassembled in use for transportion of the packaged freight, comprising the respective pairs of rectangularly formed major frames (16) and minor frames (18) mounted in the vertical direction along each of longer and shorter edges of a skid (14), respectively. One or a pair of guard members (20) are horizontally, removably attached on the top of the frames, and a pair of headers (30) are disposed along either side along which a pair of frames are mounted. All components of a disassembled returnable case are packed in a space having a height of not exceeding that of the headers.

4 Claims, 8 Drawing Sheets

RETURNABLE CASE

BACKGROUND OF THE INVENTION

1. Field of the Invention

The present invention relates to a returnable case capable of being assembled and disassembled in use for transportation of packaged freight.

2. Brief Description of the Prior Art

An example of a conventional returnable case which is disassembled as necessary comprises a skid as a bottom plate, support frames disposed on the front and rear edges of the skid, side frames disposed on the left and right edges of the skid, and a top frame connected to each of the side frames. Such a returnable case is normally assembled at a packaging site by securing all components to each other with bolts.

In conventional returnable cases, when loaded in a container or the like at returning time, each member of the case cannot be compactly enclosed, therefore making it difficult to place a number of cases without occupying a large space. Also, in conventional cases, nuts to be fastened to bolts were welded on each retaining portion. If the threads were erased, the case would become impossible to reassemble.

Some conventional returnable cases, in which wooden or steel materials were employed for the bottom, were not strong enough, and therefore not reused or required much labor for disassembly and reassembly. Another example of a case, which included a hinged connection between the frames and skid, had the further disadvantage of not being collapsible into a relatively narrow form for packing.

SUMMARY OF THE INVENTION

Accordingly, an object of the present invention is to provide a returnable case capable of being easily assembled and disassembled and when disassembled capable of saving space.

An object of the present invention is to provide a returnable case comprising a rectangular skid; a respective pair of major frames and minor frames vertically and removably mounted along a respective longer and a shorter edge of the skid; guard members removably bridged on the top of the frames; and headers secured to the skid, all components of the disassembled case capable of being packed within a space having a minimized height.

Another object of the present invention is to provide a returnable case having an L-shaped corner guide higher than that of the header secured in each corner of the headers to provide increased safety during the stacking operation.

A further object of the present invention is to provide a returnable case comprising a plurality of frames each provided with spaced vertical supports and diagonal trusses, each truss being welded at its joint position through a patch for improving mechanical strength and preventing deformation of components of the case.

A still another object of the present invention is to provide a returnable case including corner guides secured to the corner of the header having both pairs of frames fastened together by means of bolts with corner guides secured to the upper corner of the frames of one pair.

A still further object of the present invention is to provide a returnable case in which a clip having an opening and a clip nut having a nut concentrically attached therewith is provided at each joint position between the skid and the major frame or minor frame, and also between the major frame and minor frame for facilitating the replacement of nuts.

A further object of the present invention is to provide a returnable case in which the major frames, minor frames, and foot members attached below the bottom of the skid are formed of a hollow material having a rectangular section, and each free end of the foot members is closed by a cap member for providing the case with a light weight and a sufficient mechanical strength.

DETAILED DESCRIPTION OF THE PREFERRED EMBODIMENTS

Figure 1:
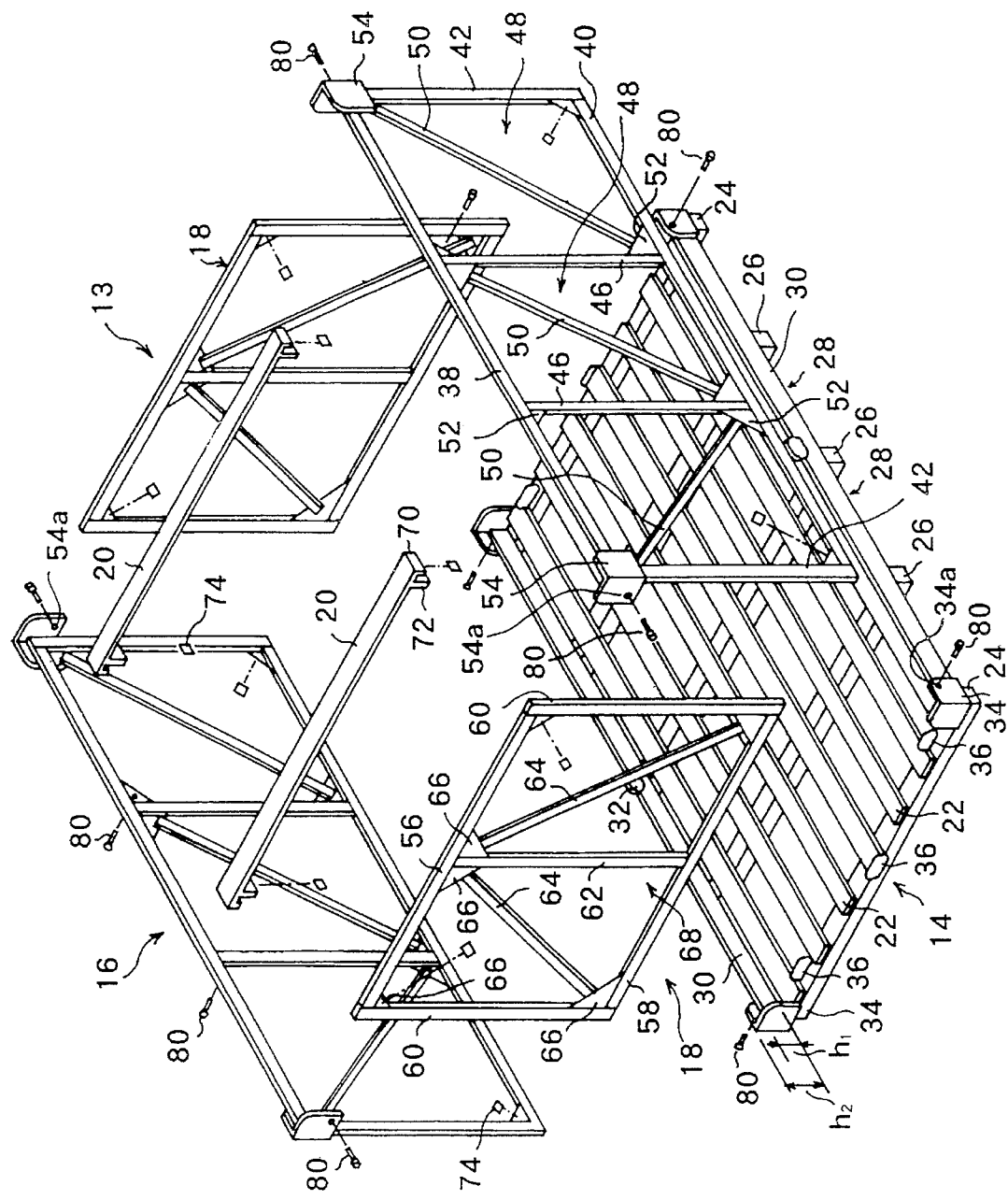
FIG. 1 is an exploded perspective view of an embodiment according to the present invention.

Referring to the drawings, a returnable case 13 according to the present invention is constructed as comprising a rectangular skid 14 formed as a bottom plate; a pair of major frames 16 each vertically, removably mounted along a longitudinal edge of skid 14; a pair of minor frames 18 each vertically, removably mounted along a shorter edge of skid 14; and a pair of guard members 20 removably attached on the top of the skid in the horizontal direction.

The skid 14 is formed of a plurality of skid members 22 spaced with a predetermined distance therebetween, and is provided with an elongated end foot member 24 along each end edge, and spaced foot members 26 disposed between the end foot members 24. Between each of adjacent foot members 24 and 26, a predetermined space 28 is formed below the skid 14.

Figure 9:
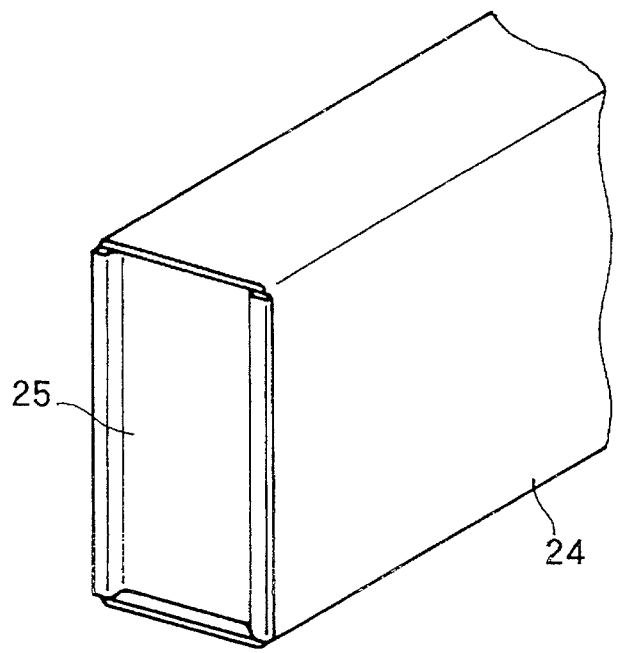
FIG. 9 is a perspective view illustrating an end of a foot member of a skid.
Figure 10:
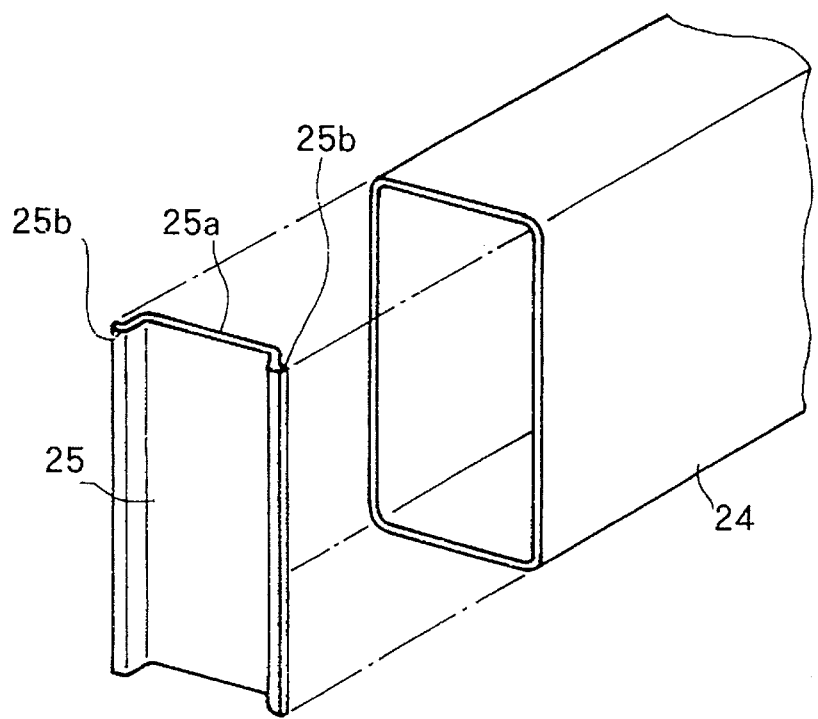
FIG. 10 is also a perspective view of a foot member of FIG. 9 with a cap separated.

As shown in FIG. 10, foot members 24 are formed of hollow bars having rectangular sections, the free ends thereof being closed, as shown in FIG. 9, by cap members 25 welded thereon formed as having a flat surface 25a recessed from the end edges 25b. Cap members are also welded on foot members 26.

Figure 8:
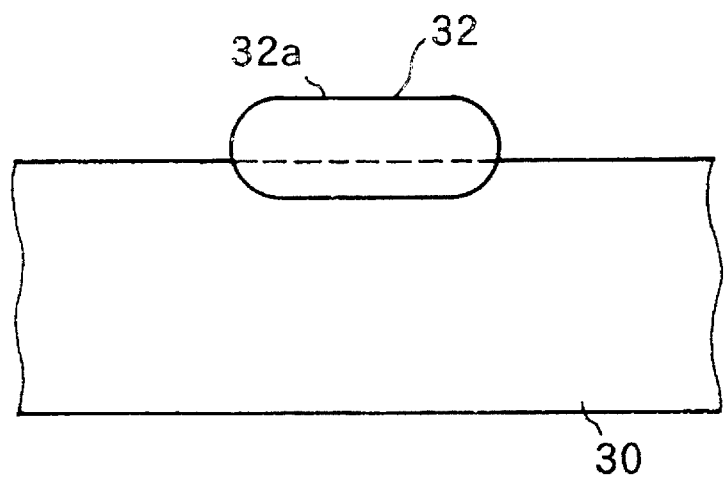
FIG. 8 is a view illustrating a retainer patch attached to a header.

A pair of headers 30 formed of a hollow bar having a rectangular section are secured to the skid 14 at each edge of which a major frame 16 is to be placed, and are provided with retainer members 32 each being formed of a pair of parallel plates 32a as shown in FIG. 8.

L-shaped corner guides 34, secured on each corner of header 30, are formed to have their lower ends flush with the lower ends of headers 30, and formed in height h2 higher than the height h1 of header 30. Each of corner guides 34 is formed with an opening 34a through its one edge for being retained by a bolt. A plurality of retainer patches 36 are staggered on the top of the side foot member 24 for positioning shorter frame 18, and are formed in the same structure as the aforementioned retainer patches 32.

A major frame 16 is formed by joining an upper bar 38, bottom bar 40, and corner strut 42 in a rectangular shape. Between the upper bar 38 and bottom bar 40, a plurality of reinforcing struts 46 are secured in parallel to corner strut 42. Between an upper bar 38 and a bottom bar 40 is secured a plurality of reinforcing supports 46, defining a plurality of rectangles 48, to each of which a diagonal truss 50 is mounted. To each truss 50 at each end is welded a trapezoidal patch 52 by way of MIG welding. A corner guide 54, welded on the top of the corner strut 42, has its one surface formed of an opening 54a for receiving a retainer bolt. Further, at each corner of two rectangles formed including both end struts 46 of a frame 16 is welded a patch 52.

A minor frame 18 is also formed in a similar manner as the major frame 18, including an upper bar 56, a bottom bar 58, corner struts 60, and reinforcing support 62 bridged between the upper bar 56 and bottom bar 58, and a diagonal truss 64 mounted on each rectangle 68 defined by struts 64. To each truss 64 at each end is welded a trapezoidal patch 66 for connecting each corner of the rectangle to each end of the truss 64. Further, at each of the two upper corners of rectangles of a frame 16 is welded a patch.

Guard members 20, also formed of a hollow bar as the above-described foot member 24, may be formed of a bulk bar. An engagement means for the upper bar 38 and a mounting plate 72 for the patch 52 are integrally formed at each end of the guard member 20. Each position on which two guard members 20 are to be disposed is defined as that between two foot members 26, and these guard members 20 are designed to be positioned to each other with a space identical to that between two forks provided on a vehicle such as a forklift in use for transportation of the cases 13.

Figure 7:
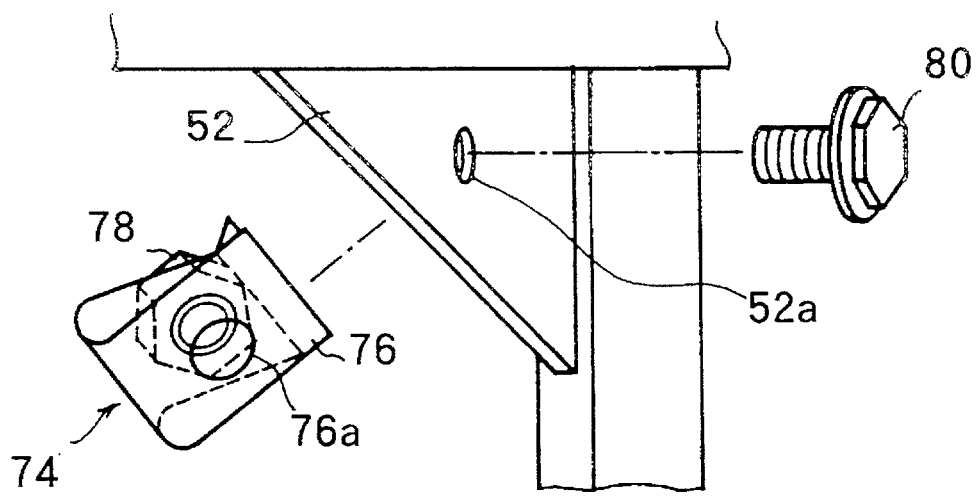
FIG. 7 is an enlarged view of a clip nut.

In the present invention, clip nuts 74 shown in FIG. 7 are typically used with bolts for joining the components. Such a clip nut 74 comprises a clip 76 having an opening 76a and a nut 78 concentrically joined therewith. The opening 76a at the nut side is formed to have a diameter slightly larger than that of nut 78, but smaller than that of the entire profile of nut 78. Instead, the opening formed in opposite to the nut 78 has a diameter larger than that of the opening 76a above. The clip nut 74 is secured to be concentric with the opening 52a against resiliency of the clip 76, and a bolt 80 is tightened thereon.

All the components, including skid members 22, bars 38, 40, 56 and 58, corner struts 42 and 60, struts 46 and 62, and trusses 50 and 64, are formed of a rectangular hollow material, thereby providing a returnable case having a minimized weight. Also, the hollow material is used in the form that the minor thickness is in the vertical direction when the components are packed, thereby reducing the packing space.

The above-mentioned headers 30 may be also secured along the direction of the shorter edges of skid 14, instead of placing the headers 30 along the longer edges of skid 14, for securing all frames 16 and 18 on skid 14. In such an alternative case, corner guides 54 are disposed on the upper corners of minor frames 18, instead of the major frames 16. Also, guard members 20 may be bridged between minor frames 18.

To assemble the case 13, first, the major frames 16 with their bottom bars 40 are positioned on the retainer patch 32, and bolts 80 are tightened to secure the lower corners.

In the next step, minor frames 18 are mounted such that the bottom bars 58 are received between the staggered retainer plates 36, and the upper corners are secured to the corner guides 54 by means of bolts 80.

As stated above, after one major frame 16 and both opposed minor frames 18 have been mounted, the freight such as cardboard packages are stacked on the skid 14.

Thereafter, the other major frame 16 is mounted, and two guard members 20 are secured on the predetermined positions in parallel to minor frames 18 by tightening the bolts 80. After being assembled, the returnable cases 13 are stacked by a forklift or the like in a container and transported.

Thus the returnable cases 13 are stacked, the two blades of a forklift are inserted into the space 28 so that each blade is positioned just below each of guard members 20, and the skid 14 is raised upwardly. In this manner, when two returnable cases 13 are stacked on each other, the two blades are prevented from entering the upper portion of the case 13 by engaging with the edge of guard member 20, and the freight such as cardboard cases are completely prevented from being damaged.

The assembled returnable case 13 is easily disassembled in the opposite sequence by releasing each joint position. After being disassembled, the returnable case 13 is received in a container through the following steps.

Figure 2:
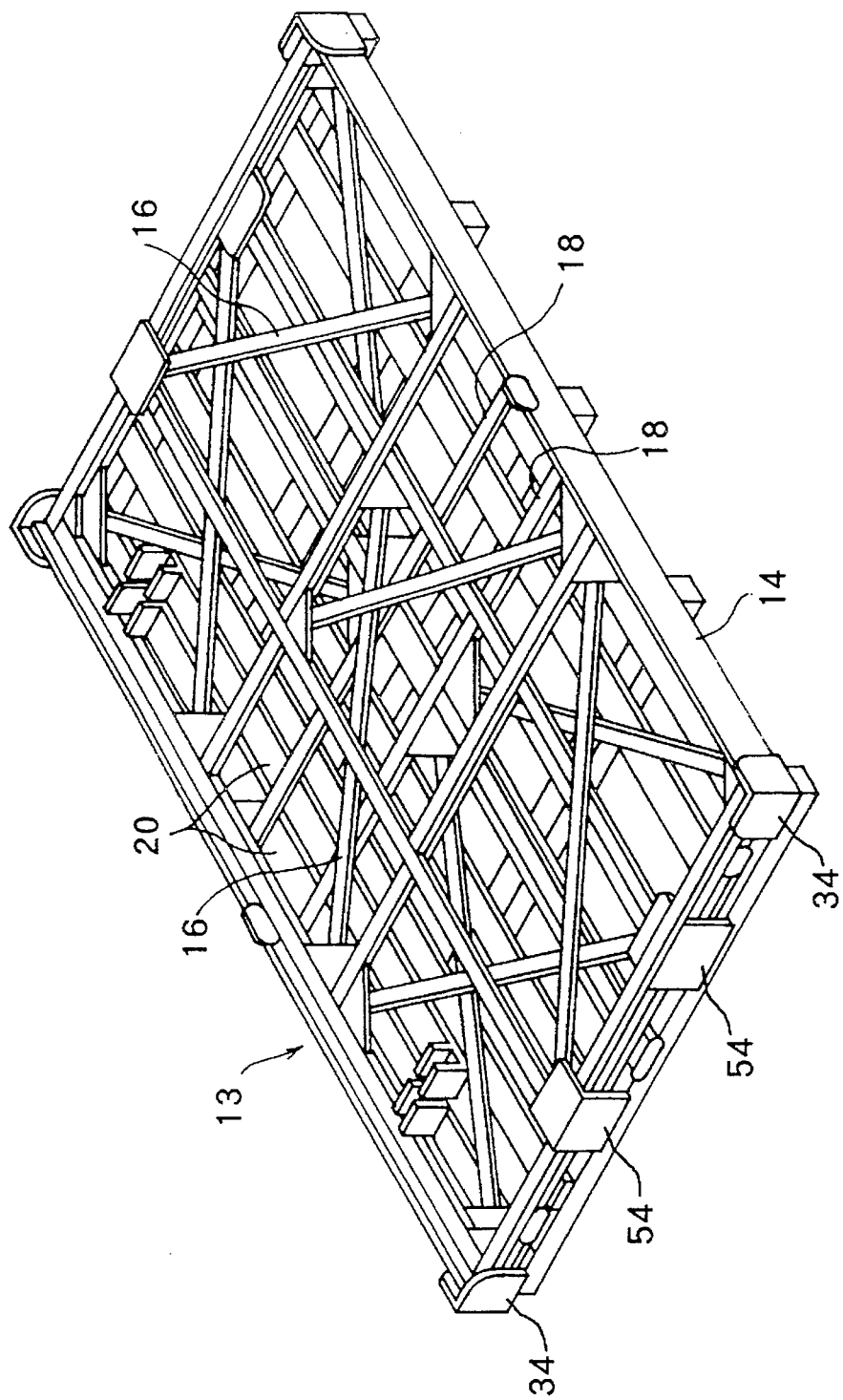
FIG. 2 is a perspective view of a disassembled and packed returnable case of FIG. 1.

On the skid 14, first a pair of disassembled minor frames 18 are placed along the shorter edge of skid 14 so as not to be superposed, and two guard members 20 are placed on skid 14 in parallel to the shorter or longer edge thereof. Then, as shown in FIG. 2, a pair of major frames 16 are placed along the longer edge of skid 14 so that the upper corner guide 54 would not upwardly extend, where the upper corner guide 54 serves to prevent movement of minor frames 18. The thickness of each component and height of the header 30 are designed so as not to exceed the height of each component placed on the skid 14. In the case that the upper corner guide is secured to the upper corner of minor frames 18, a pair of major frames 16 may be placed beneath a pair of minor frames 18, or guard members 20 may be placed on the highest position.

In such a manner, all components are collected on the skid 14, a plurality of skids being stacked and received in a container, and the returnable cases 13 are returned.

Figure 3:
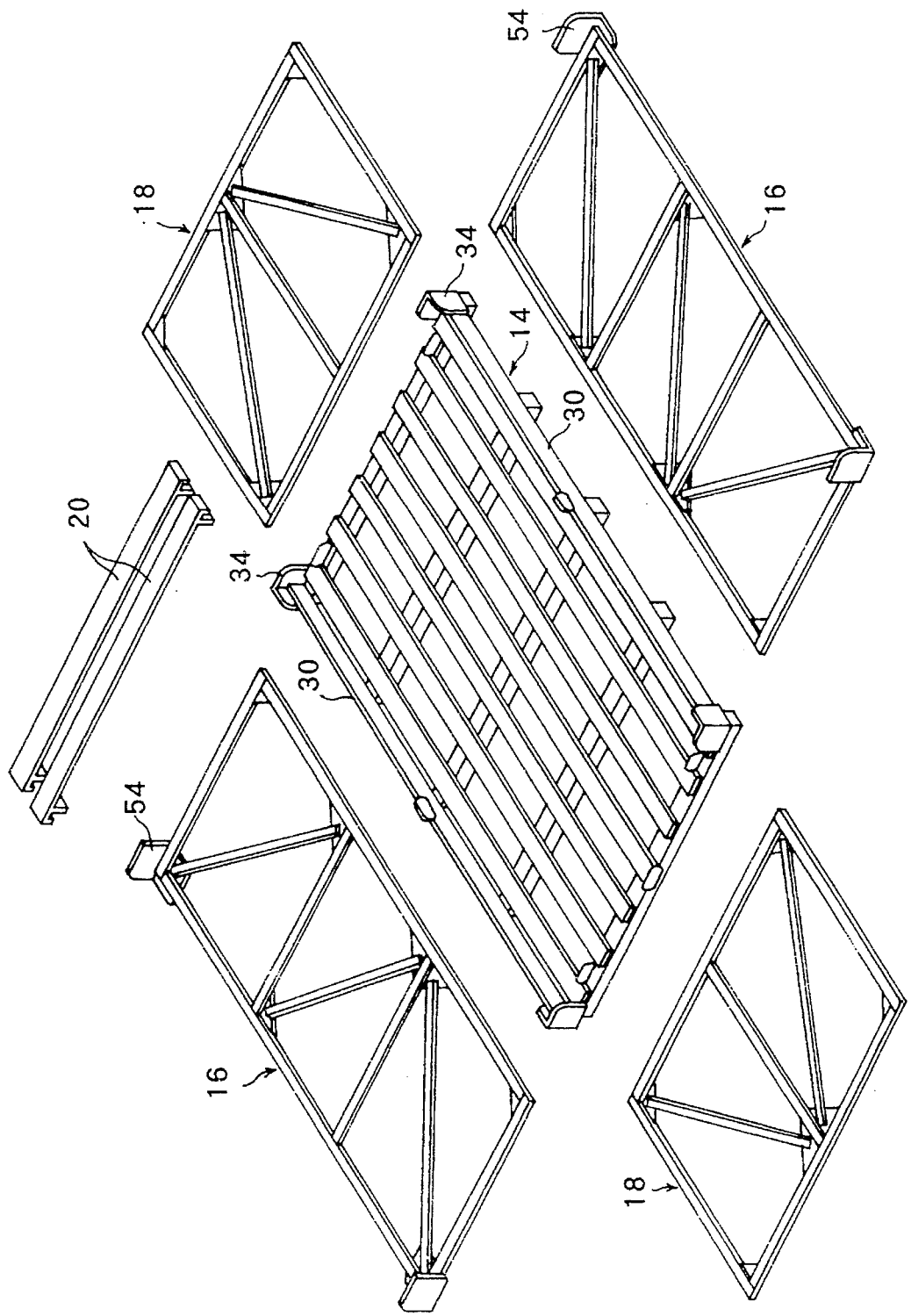
FIG. 3 is an extended perspective view of a disassembled returnable case of FIG. 1.
Figure 4:
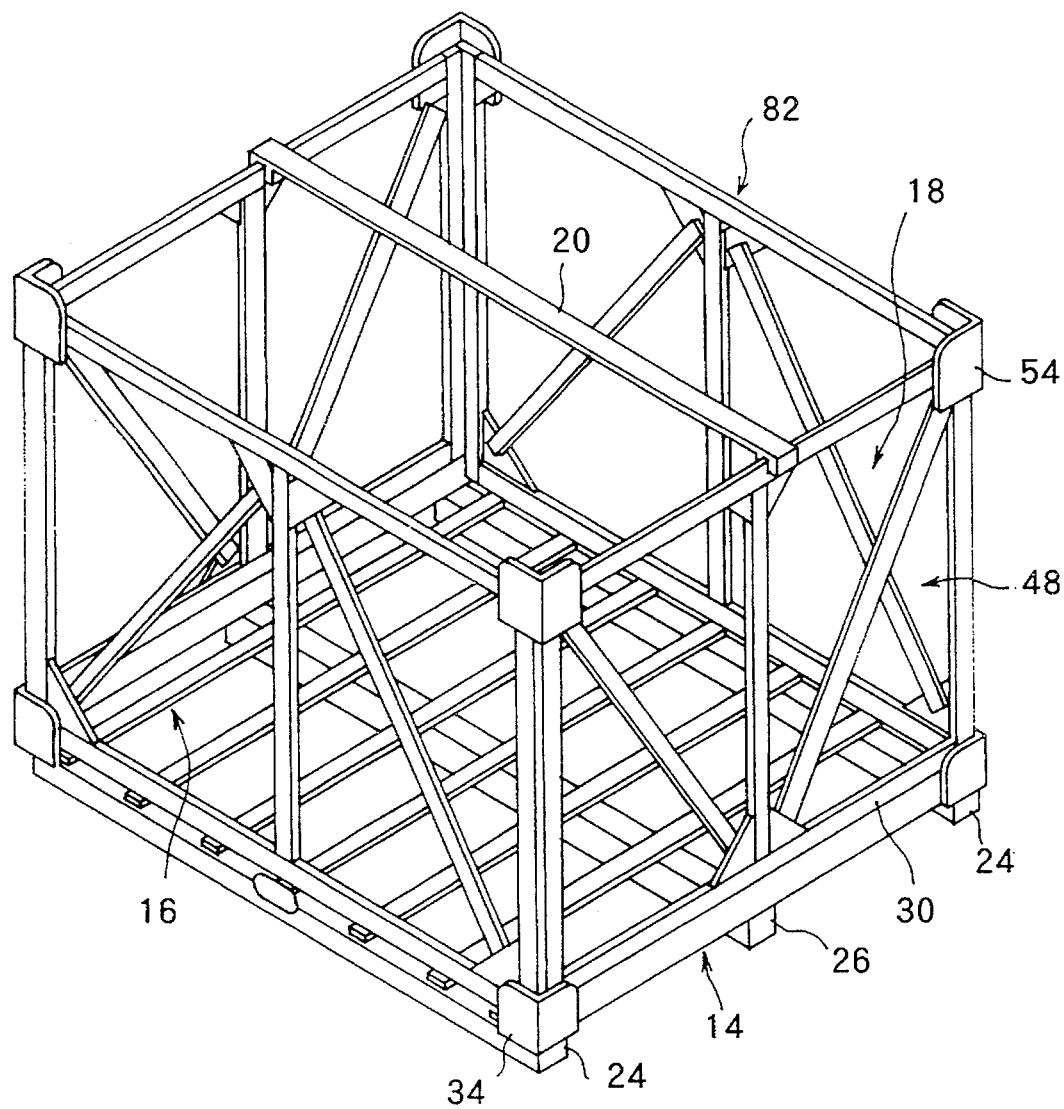
FIG. 4 is a perspective view of another embodiment of the present invention.
Figure 5:
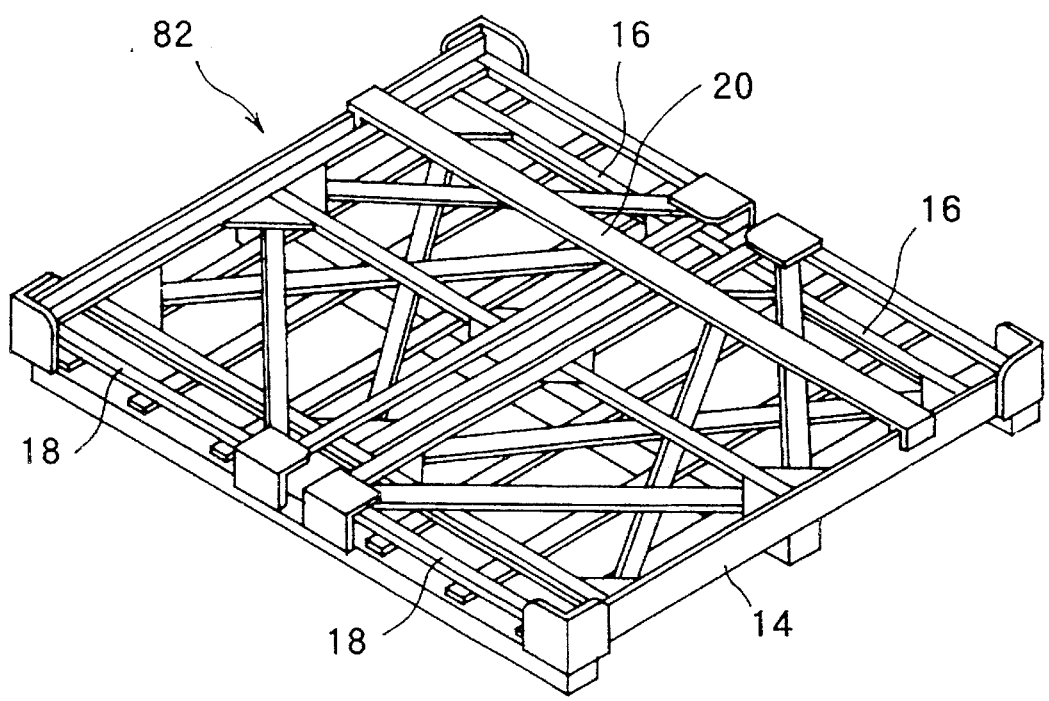
FIG. 5 is a perspective view of a disassembled and packed returnable case of FIG. 4.
Figure 6:
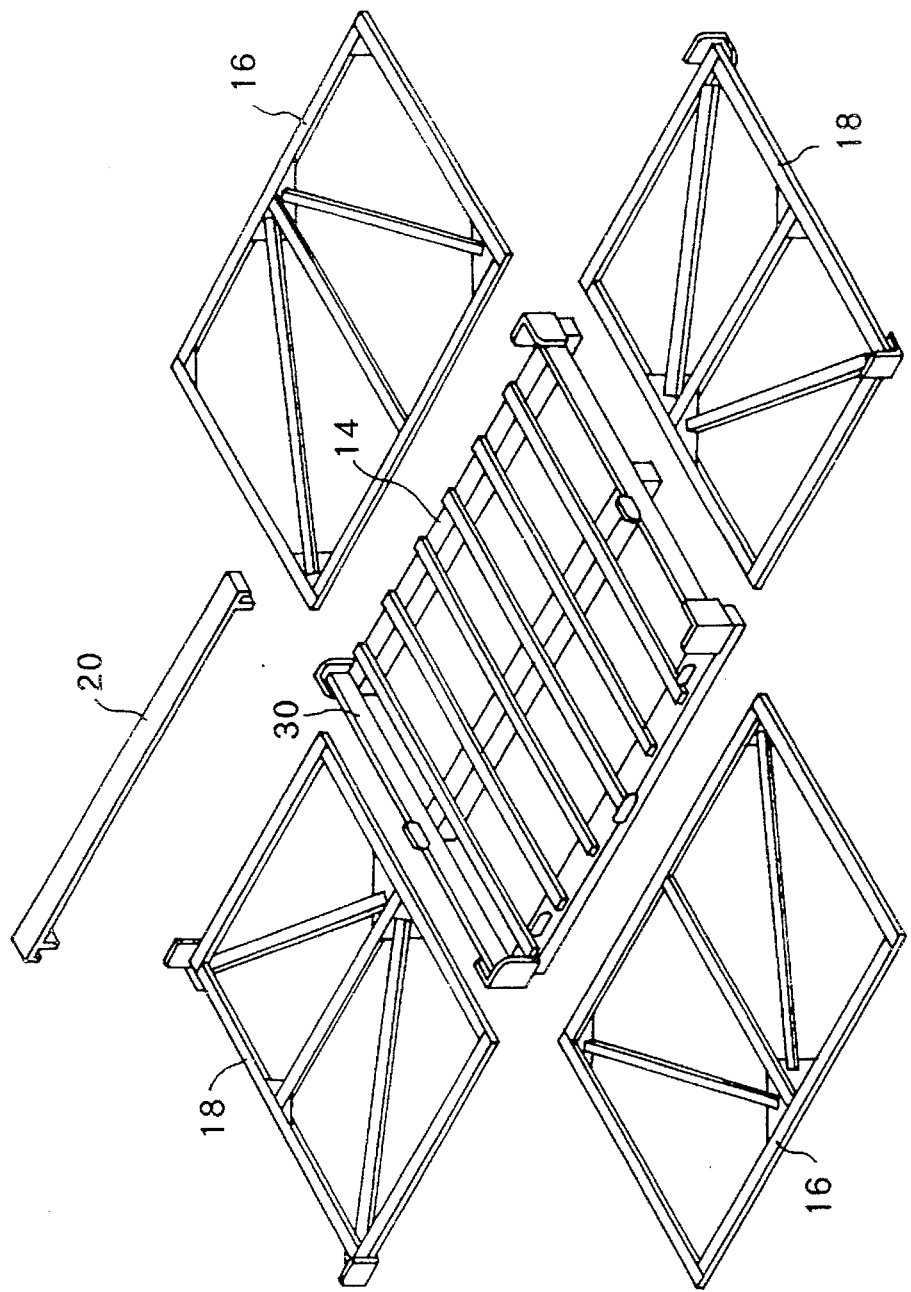
FIG. 6 is an extended perspective view of a disassembled returnable case of FIG. 4.

FIGS. 4, 5 and 6 illustrate another embodiment of the returnable case, each illustrating the case 82 assembled, disassembled and each of the components thereof. Reference numerals for the same components are identical to those in FIGS. 1 to 3.

The smaller sized returnable case 82 illustrated in FIGS. 4 to 6 includes two rectangular elements 48, foot members 24 and 26 which are parallel to each of bars 38 and 40, and a single guard member 20. The upper corner guides 54 are secured to minor frames 18. In the enclosing step after being disassembled, a pair of minor frames 18 are placed upon a pair of major frames 16 as shown in FIG. 5.

Such a returnable case 82 is assembled in the same manner as the returnable cases 13, as follows. One minor frame 18 is placed on one header 30 of skid 14 and fastened by means of bolts, and the major frames 16 are fastened to corner guides 54 by means of bolts. The freight such as cardboard packages are stacked on the skid 14, and the other minor frame 18 and guard members 20 are fastened by bolts.

The assembled returnable case 82 is easily disassembled in the opposite sequence by releasing the bolts. Then, major frames 16, minor frames 18 and guard members 20 are placed on the skid 14.

In the returnable cases 13 and 82 of the invention, all the disassembled components of the frames are stacked within a small space having a height of header 30, which effects saving of space necessary for packing. Bolts may be tightened at only 4 positions including those between the lower corner guides 34 and corner patches on the lower edge of the frame, and another 4 positions including those between the upper corner guides 54 and corner patches on the upper edge of the frame, that is, only 8 positions are required. Even if both ends of guard members 20 are added, very few positions are required.

Corner guides 34 at the four corners of skid 14, having the height h2 and extending upwardly beyond the headers 30, would effectively receive the foot members 24 of skids 14 which are stacked thereon at the returning step. This improves stability of stacked skids and safety of labor. The upper L-shaped corner guides 54, to be fastened by bolts when assembled, engage with the sides of skid 14 having no headers 30 when disassembled thereby serving as a retainer for preventing components from sliding out of these sides. In the case of full size case 13 as shown in FIG. 1, corner guides 54 are extended upwardly to be engaged with foot member 24. On the other hand, in the case of the half size 82, guides 54 are not extended upwardly thereby preventing possible problems caused by stacking with a full size case 13.

Reinforced by support members 46, 62 and diagonal trusses 50, the frames 16 and 18 are provided with sufficient mechanical strength without any deformation, even formed of a light weight hollow beam material.

Clip nuts 74 conveniently employed for being tightened with bolts are easily replaced in case their threads are damaged. For preventing escapement of nuts 74, corner patches of frames 16 and 18 are disposed inside the outer surface of the frames as shown in FIG. 7.

Retainer patch 32 provided on header 30 serves to prevent lateral movement of frames 16 and 18. Also, foot members 24, closed by cap members 25 at both ends, are provided with sufficient strength.

What is claimed is:

1. A returnable case comprising:

a rectangular skid formed as a bottom plate comprising a pair of long edges and a pair of short edges;

a pair of major frames each vertically, removably attached to said skid along said pair of long edges thereof, said major frames having first and second ends;

a pair of minor frames each vertically, removably attached to said skid along said pair of short edges thereof, said minor frames having first and second ends;

removable guard members disposed over said major frames and minor frames, said guard members being parallel to at least one of said long edges and short edges of said skid; and a pair of headers having a predetermined width, height and first and second ends secured on said skid at each location where said major frames and minor frames are placed;

L-shaped corner guides having a dimension higher than said height of said headers secured on said first and second ends of said headers;

each of said major frames and minor frames having spaced vertical supports and diagonal trusses and a pair of lower and upper corner patches, with said trusses being welded to said pair of lower and upper corner patches;

all components of disassembled major frames, minor frames and guard members capable of being enclosed within said predetermined width of said headers.

2. A returnable case comprising:

a rectangular skid formed as a bottom plate comprising a pair of long edges and a pair of short edges;

a pair of major frames each vertically, removably attached to said skid along said pair of long edges thereof, said major frames having first and second ends;

a pair of minor frames each vertically, removably attached to said skid along said pair of short edges thereof, said minor frames having first and second ends;

removable guard members disposed over said major frames and minor frames, said guard members being parallel to at least one of said long edges and short edges of said skid; and a pair of headers having a predetermined width, height and first and second ends secured on said skid at each location where said major frames and minor frames are placed;

all components of disassembled major frames, minor frames and guard members capable of being enclosed within said predetermined width of said headers;

one pair of at least one of said major frames and minor frames having said first and second ends attached with upper corner guides, with the other pair of frames not having upper corner guides;

lower corner guides attached to said first and second ends of said pair of headers are secured to said pair of lower corner patches of each of said major and minor frames by means of bolts; and said pair of frames having said first and second ends attached with said corner guides having said corner guides attached to said first and second ends of said pair of frames not having corner guides.

3. A returnable case according to claim 2, wherein a clip having an opening and a clip nut having a nut concentrically attached therewith are provided at each joint position between said skid and at least one of said pair of major frames and minor frames, and also between said pair of major frames and minor frames.

4. A returnable case according to claim 3, wherein said skid is further comprised of foot members having two ends attached below the bottom of said skid, and said pair of major frames, said pair of minor frames, and said foot members are formed of a hollow material having a rectangular section, and each free end of said two ends of said foot members is closed by a cap member.

* * * * *